Nov. 7, 1939.  C. E. KRAUS  2,178,590
METHOD OF AND APPARATUS FOR SURFACING METAL WORKPIECES
Filed March 27, 1937  4 Sheets-Sheet 3
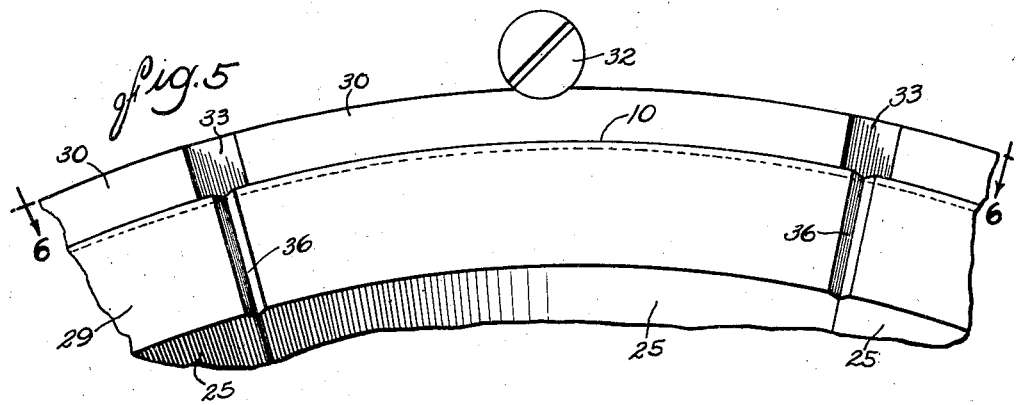
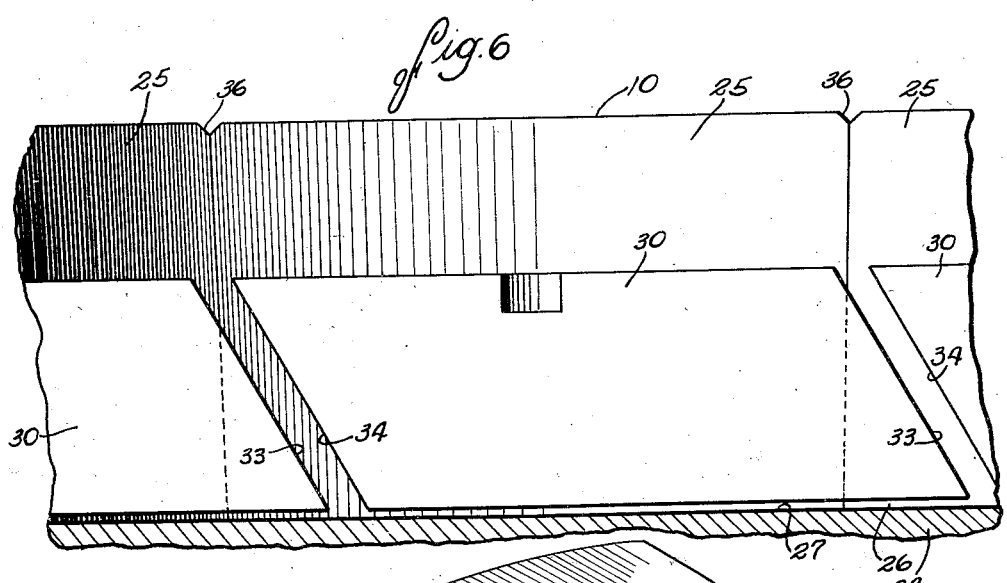
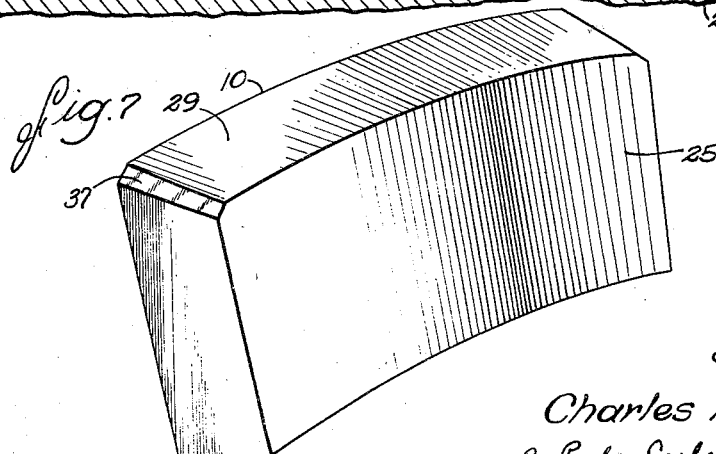
INVENTOR
Charles E. Kraus
By Parker, Carlson, Pitzner & Hubbard
ATTORNEYS Nov. 7, 1939.   C. E. KRAUS   2,178,590
METHOD OF AND APPARATUS FOR SURFACING METAL WORKPIECES
Filed March 27, 1937   4 Sheets-Sheet 4

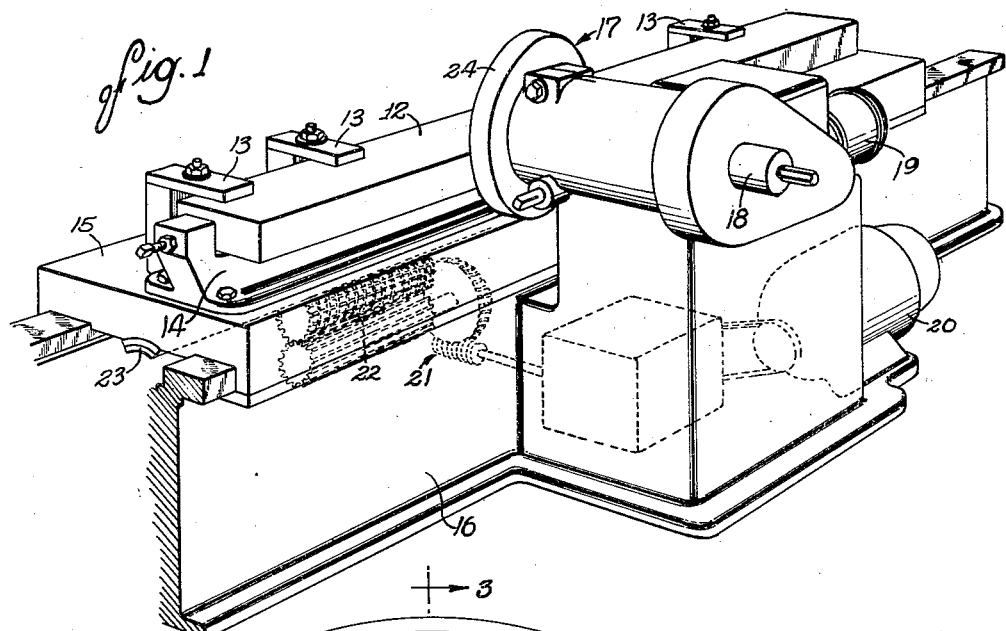
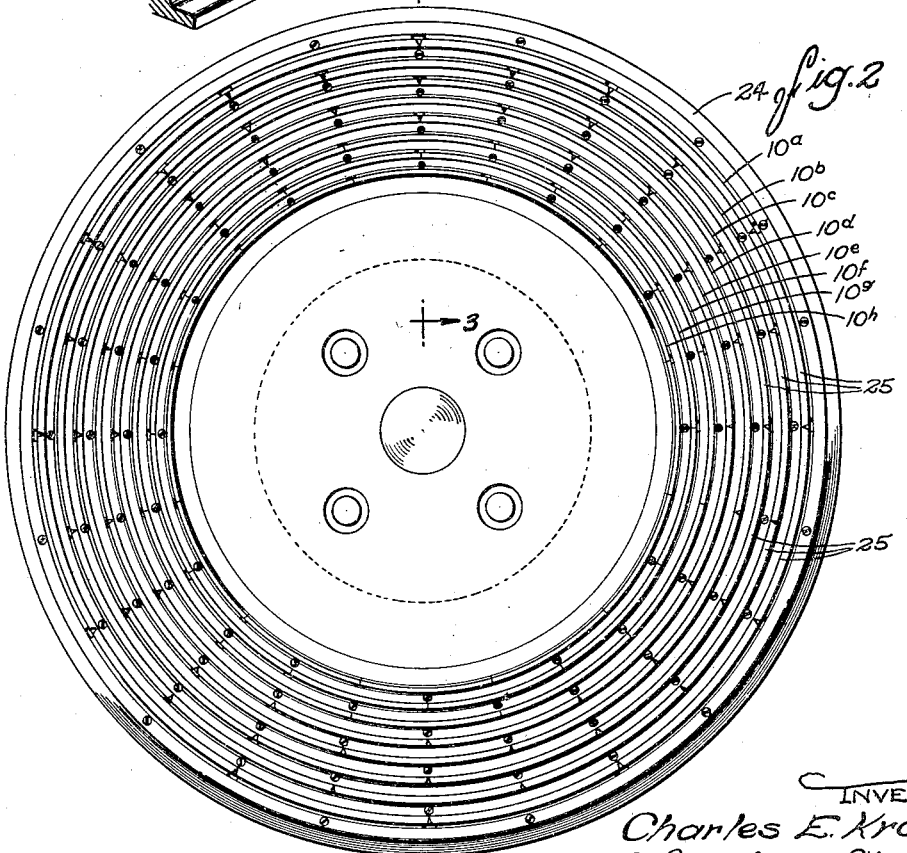

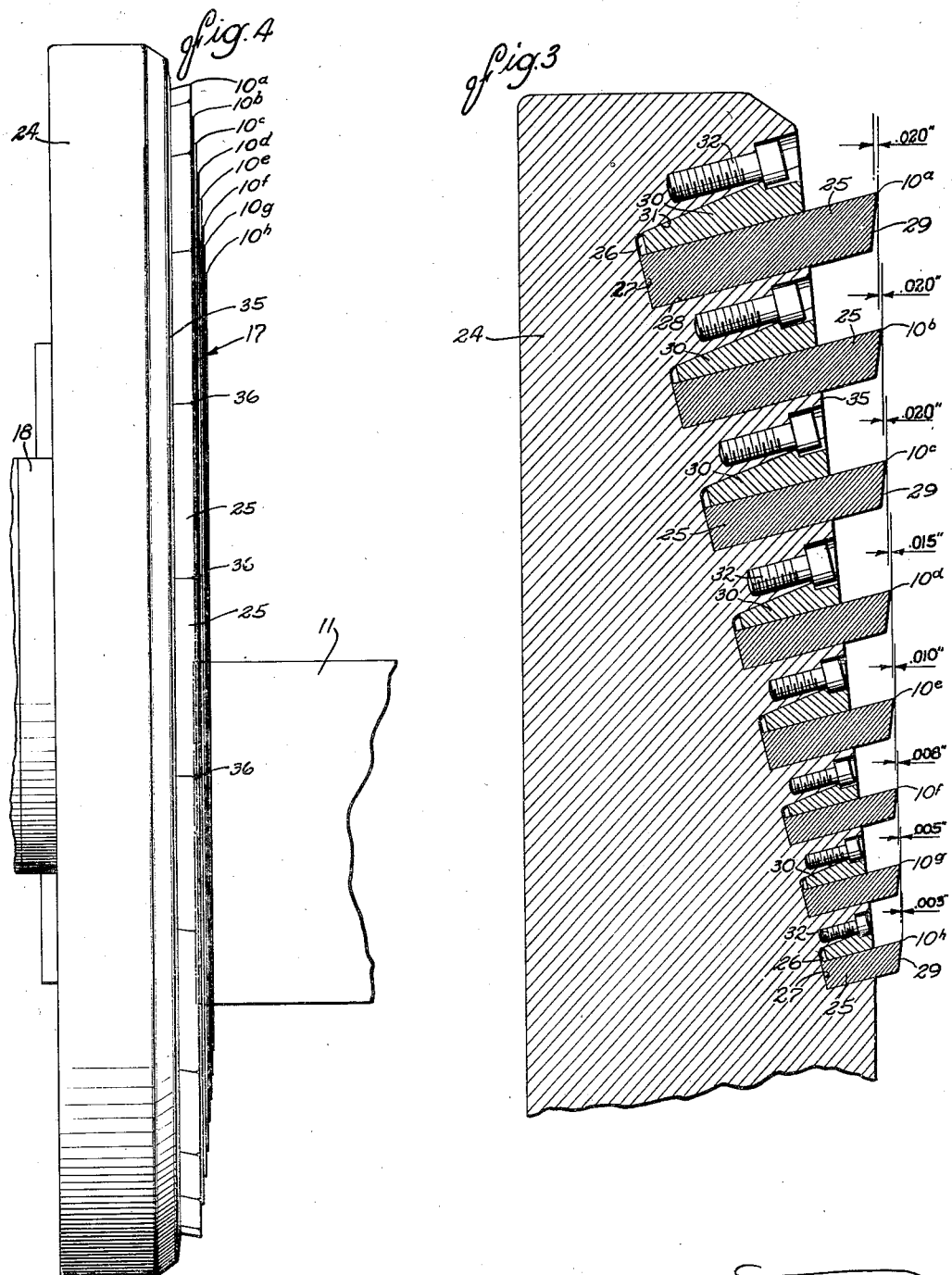

INVENTOR
Charles E. Kraus
By Parker, Carlson, Pitzner, Hubbard
ATTORNEYS

Patented Nov. 7, 1939

2,178,590

UNITED STATES PATENT OFFICE 2,178,590

METHOD OF AND APPARATUS FOR SURFACING METAL WORKPIECES

Charles E. Kraus, Rockford, Ill., assignor to The Ingersoll Milling Machine Company, Rockford, Ill., a corporation of Illinois Application March 27, 1937, Serial No. 133,346

17 Claims. (Cl. 90—18)

This invention relates to the removal of layers of metal stock from metal workpieces to form continuous plane surfaces thereon by means of a multiple blade rotary cutter while the work and cutter are being fed relative to each other longitudinally of the surface to be produced.

The primary object of the present invention is to provide a novel method and machine by which metal workpieces may be reduced to a plane surface through the removal of the metal in slices the thickness of which is independent of the rate of feeding movement.

A more detailed object is to remove a layer of metal stock from a workpiece in thin slices through the use of a cutter having a series of concentric circular cutting edges.

The invention also resides in the novel construction of the cutter.

Other objects and advantages of the invention will become apparent from the following detailed description taken in connection with the accompanying drawings in which Figure 1 is a perspective view of a typical machine tool in which the present invention may be practiced.

Fig. 2 is a face view of the cutter.

Fig. 3 is a fragmentary diametrical cross-sectional view of the cutter taken along the line 3—3 of Fig. 2.

Fig. 4 is a side elevational view of the cutter and a portion of a workpiece.

Fig. 5 is an enlarged fragmentary view of a portion of Fig. 2.

Fig. 6 is a sectional view taken along the line 6—6 of Fig. 5.

Fig. 7 is a perspective view of one of the cutter blade segments.

Figure 8:
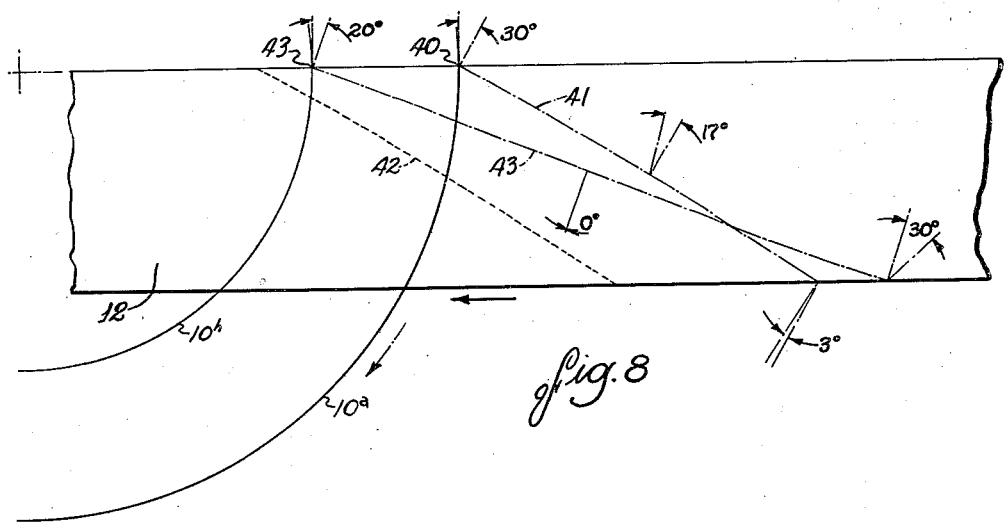
Fig. 8 is a schematic view illustrating the paths of the work and the cutting edges.

While the invention is susceptible of various modifications, I have illustrated in the drawings and will herein describe in detail the preferred embodiment and method of practicing the invention. It is to be understood, however, that I do not intend to limit the invention by such disclosure but aim to cover all modifications and alternative methods and constructions falling within the spirit and scope of the invention as expressed in the appended claims.

Generally stated, the improved method comprises rotating a multiplicity of concentric circular cutting edges $10^a$ to $10^h$ which are disposed in closely spaced axial planes, supporting a workpiece $11$ to be machined with the plane of the smallest cutting edge coinciding with the plane of the desired final work surface $12$ and with the planes of the other edges intersecting the surface layer to be removed, and during such rotation of the edges, causing relative feeding movement between the edges and the positioned workpiece longitudinally of the final work surface whereby the successively smaller edges will cut from the workpiece extremely thin slices of metal down to the final surface. To enable the cutting edges to operate upon the work at advantageous shear angles, the rate of feeding movement is correlated with the peripheral speed of the cutting edges and the cutting edge which cuts the finished work surface is formed of a radius greater than the width of the work so that the feeding movement may be along a path offset from the rotational axis of the edges and within the confines of the finally acting cutting edge. To facilitate the formation of a smooth finish on the final work surface, the spacing of the adjacent cutting edges decreases in stages from the outermost to the innermost edges.

The machine shown in Fig. 1 is typical of the various types which may be utilized in carrying out the present invention. In the machine shown, the workpiece $11$ to be machined is secured by suitable clamps $13$ upon a support $14$ on a reciprocable table $15$ which is mounted on a bed $16$ so as to move the workpiece across the face of a rotary cutter $17$ from which the cutter edges $18$ project axially. The cutter is fast on a spindle $18$ driven through suitable gearing by power derived from an appropriate source such as an electric motor $19$. The spindle is journaled in bearings preferably disposed close to the cutter so as to support the latter with the proper rigidity.

Relative feeding movement between the cutter head and the work at the proper rate may be effected and controlled in various ways well understood in the art. In the present instance, the table is arranged to be reciprocated by power derived from a reversible electric motor $20$ and transmitted through suitable speed reducing mechanism including gearing $21$ and a screw $22$ meshing with a rack $23$ on the table.

The cutter $17$ comprises a generally cylindrical body $24$ suitably fastened to the end of the spindle and supporting a multiplicity of substantially continuous circular blades $25$ of progressively decreasing diameters and concentric with the axis of the cutter spindle. The cutting edges $10^a$ to $10^h$ are formed on the successively smaller blades and are disposed in parallel planes perpendicular to the spindle axis and progressively spaced along the latter away from the plane of the outermost edge 10ʰ as shown in Figs. 3 and 4.

To facilitate formation, removal, and replacement, each of the cutting blades preferably comprises a series of segments (Fig. 7) arranged in abutting end to end relation around an axially opening circular slot 26 in the face of the body 18. Each segment is seated against the bottom 27 of the slot and the inner side wall 28, the latter being of conical shape so as to enable the blade segments to be set at an incline to provide the proper rake angle. Suitable clearance surfaces 29 are formed on the projecting ends of the segments.

In the present instance, the blade segments are held in place by inwardly tapering wedges 30 each received in the tapered recess between one side of the blade segment and the opposite wall 31 of the slot. Screws 32 threading into the body 18 with their heads overlying the wedges 30 serve to lock the latter in wedged position. The wedges are also of segmental form and preferably somewhat shorter in circumferential length than the blade segments so that the adjacent ends of the wedges are spaced apart a short distance. The adjacent end surfaces 33 and 34 parallel each other and are inclined relative to the cutting edges 10 (see Fig. 6) so that by driving a drift pin into the recess between the adjacent wedges, the wedging action on one of the latter will be released permitting removal of the wedge and the associated segment. By virtue of this segmental construction and the manner of releasing the blade locks, the cutting edges may be constructed at a relatively low cost and any desired portion thereof may be replaced cheaply and conveniently.

In view of the substantially greater amount of metal which will be removed with the outermost or roughing edges of the concentric series, greater chip clearance spaces and a somewhat more rigid mounting are provided for these edges. To this end, the end face 35 of the cutter body is formed of generally conical contour, and the depth of the blade slots is increased progressively from the inner to the outermost slots. In this way, a greater supporting area is obtained, while the conical shape of the body enables greater chip clearance spaces to be obtained. The desired chip clearance may also be obtained by proper radial spacing of the cutting edges. To permit this without proportionately increasing the overall radial width of the entire group of edges, it is preferred to decrease the radial spacing between the adjacent cutting edges progressively from the outer to the inner or finishing edges where less chip clearance is required.

The number of cutting edges is of course determined by the thickness of the stock to be removed and the maximum chip thickness desired. It has been found desirable in practice to limit the maximum chip thickness to approximately .020 of an inch, such spacing being employed in the present instance between the outermost cutting edges 10ᵃ, 10ᵇ and 10ᶜ. To enable the final work surface to be formed with a smooth accurate finish, it is preferred to decrease in stages the thickness of the metal slices removed by the other edges. Thus, the several innermost cutting edges may be spaced lesser distances apart as indicated in Fig. 3. With eight cutting edges spaced as shown, the cutter is adapted to remove a layer of metal stock approximately ⅒ of an inch in thickness.

To reduce vibration and facilitate breaking of the chips, the edges which cut the thickest slices of metal are formed at annularly spaced points with notches 36 with the notches on the adjacent edges arranged in staggered relation. Such notches may be formed by beveling the ends of the blade segments as indicated at 37 (Fig. 7). At least two of the innermost edges are uninterrupted and operate to take the final or finishing cuts so as to leave a continuous smooth surface. Owing to the extreme thinness of the cuts taken by these edges, the metal slices will break up properly without causing objectionable vibration.

In order that all of the cutting edges may operate at advantageous shear angles throughout their range of cutting engagement with the work, the cutter above described is intended to operate upon work surfaces having a width somewhat narrower than the radius of the smallest or innermost cutting edge 10ʰ. Thus, the workpiece 11 is mounted as shown in Figs. 4 and 8 to travel in a path offset from the cutter axis and preferably with one side edge disposed adjacent or in line with the cutter axis, the other edge being spaced inwardly from the cutting edge 10ʰ. Of course, the work is positioned axially of the cutter so that the plane of the work surface 12 to be produced coincides with the plane of the innermost or finally acting cutting edge 10ʰ.

The invention also contemplates a correlation of the rate of feed and the peripheral speed of the cutting edges such as to obtain advantageous shear angles and this, in spite of the variations which occur in the shear angle at which a point on a cutting edge acts in traversing across the moving workpiece. For example, in machining cast iron, it is desirable to employ shear angles of less than thirty degrees in order to avoid excessive wear on the cutting edges. Angles within this limit may be obtained, for example, by feeding a workpiece of the width shown at a speed approximately one and one-half times the peripheral speed of the outermost cutting edge 10ᵃ. To illustrate the action of the cutting edges reference will now be made to Fig. 8 which shows the paths traversed by points on the inner and outer cutting edges 10ᵃ and 10ʰ when the work and cutter are moved at the speeds assumed and in the directions indicated. A point 40 on the outermost edge 10ᵃ would traverse the work along a path 41, entering the work at a shear angle of approximately thirty degrees. This angle would decrease progressively as shown to approximately three degrees as the point leaves the work. If the point 40 is at one end of a blade segment 25, the opposite end of this segment would traverse the work along a path 42 so that the width of the chip would be equal to the distance between the lines 41 and 42. A point on the innermost cutting edge 10ʰ would follow a path 43 operating a positive shear angle of twenty degrees at the point of entry, decreasing to zero near the center of the path and then increasing to a negative angle of thirty degrees as the point leaves the work.

Figure 9:
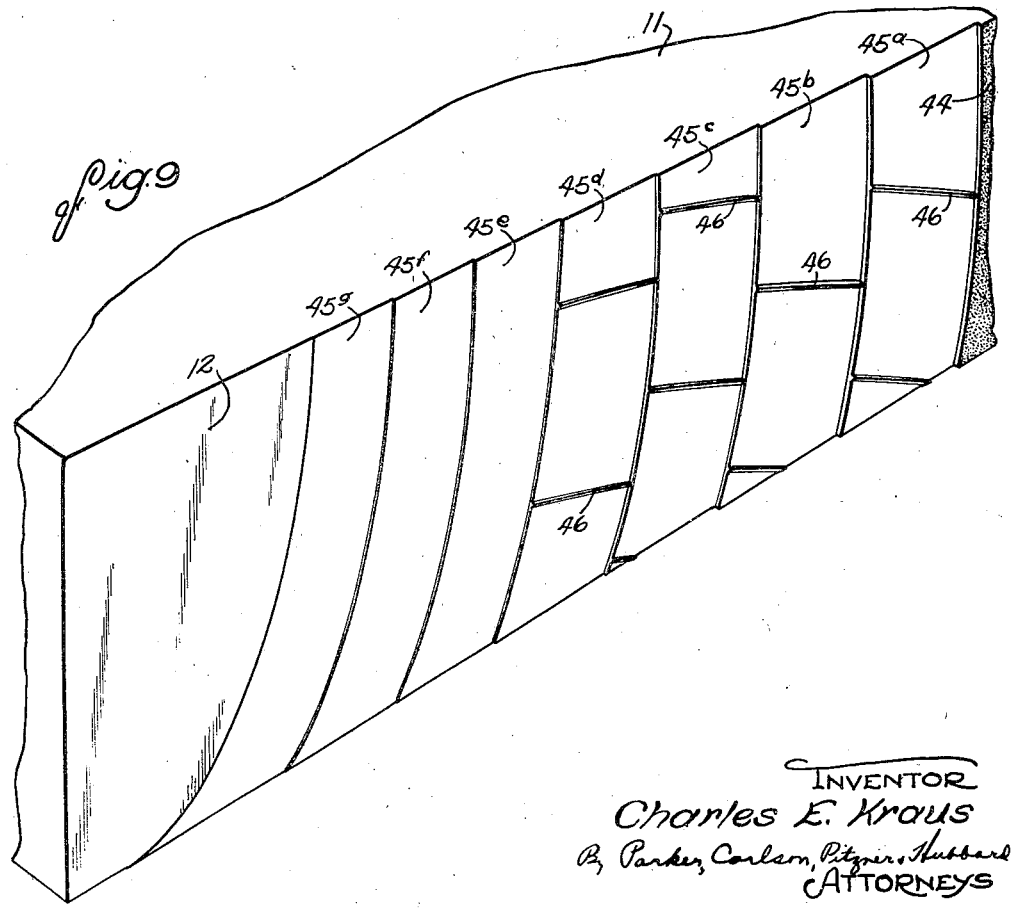
Fig. 9 is a fragmentary perspective view of a partially machined workpiece.

When the workpiece is positioned as above described and fed past the rotating edges 10, the successively smaller cutting edges will remove metal in thin slices disposed parallel to the final or finished surface 12 so that the thickness of each slice is wholly independent of the rate of feed. Except in the case of the outermost edge, the thickness of each slice is determined solely by the spacing of the cutting edge by which it is formed relative to the adjacent outer edge. Of course, the cutter is designed relative to the maximum thickness of metal stock to be removed so that in spite of variations in the contour of the rough work surface 44, the outermost edge 10ᵃ will not ordinarily be required to cut deeper than approximately .020 of an inch. The manner in which the metal slices are cut by the different edges is illustrated in Fig. 9. From this it will be seen that the successive cutting edges operate on the work to form surfaces 45ᵃ to 45ᶠ and 12 which are stepped according to the axial spacing of the edges toward the final or finished surface 12. Ridges 46 are left by the notches 36 in the outer or roughing edges, but these are removed by the next engaging cutting edges or by one of the finishing edges.

Through the use of a series of circular cutting edges in the manner above described, it will be seen that metal may be removed from a workpiece to form a plane surface thereon at a rate many times greater than it is possible in present face milling or broaching practice and this, without placing an additional burden upon the cutting edges. These advantageous results are due to the fact that the thickness of the chips removed is unaffected by the rate of feed and the further fact that the rate of feed is not limited by the shape or position of the cutting edge. Thus, the rate of feed may be increased to any value desired up to the point where the maximum permissible cutting speed between the work and the cutting edges obtains.

I claim as my invention:

1. A machine for removing metal from a workpiece to form a plane surface thereon comprising, in combination, a cutter head having a series of concentric circular cutting edges disposed in planes approximately parallel to the plane of the desired final work surface and positioned progressively along the axis of said head, the radius of the innermost cutting edge being greater than the width of said final work surface, means for rotating said cutter head, and means for causing relative feeding movement between said head and the workpiece in a direction parallel to the plane of said final surface and along a path offset from the cutter axis and within the radius of said innermost edge whereby to remove all of the metal in the path of said edges in the form of thin slices of metal down to the final work surface determined by said innermost edge.

2. A machine for removing metal from a workpiece to form a plane surface thereon comprising, in combination, a cutter head having a series of concentric substantially continuous cutting edges disposed in planes approximately parallel to the plane of the desired final work surface and positioned progressively along the cutter axis, means for rotating said cutter head, and means for causing relative feeding movement between said cutter head and a piece of work in a direction parallel to the plane of said final surface to effect removal from the work by the successive inwardly spaced edges of thin slices of metal progressing from the outer face of the work to said final work surface.

3. A machine for removing metal from a workpiece to form a plane surface thereon comprising, in combination, a cutter head having a series of concentric substantially continuous cutting edges disposed in planes approximately parallel to the plane of the desired final work surface and positioned progressively along the cutter axis, the axial spacing of the innermost edges being substantially less than the outermost edges, means for rotating said cutter head, and means for causing relative feeding movement between said cutter head and a piece of work in a direction parallel to the plane of said final surface to effect removal from the work by the successive inwardly spaced edges of thin slices of metal progressing from the outer face of the work to said final work surface.

4. A machine for removing metal from a workpiece to form a plane surface thereon comprising, in combination, a cutter head having a series of concentric substantially continuous cutting edges disposed in planes approximately parallel to the plane of the desired final work surface and axially spaced progressively increasing distances apart, means for rotating said cutter head, means supporting a workpiece with the plane of the innermost edge coincident with the final work surface to be produced, and means for causing relative feeding movement between said cutter head and a piece of work in a direction parallel to the plane of said final surface and along a path offset laterally from the axis of said head to effect removal from the work by the successive inwardly spaced edges of thin slices of metal progressing from the outer face of the work to said final work surface.

5. A machine for removing metal from a workpiece to form a plane surface thereon comprising, in combination, a cutter head having a series of concentric circular cutting edges disposed in planes approximately parallel to the plane of the desired final work surface with the successively smaller edges spaced progressively along the axis in a direction away from said head, means supporting a workpiece for movement along a path parallel to said final surface and offset laterally from the axis of said head with the plane of the innermost edge coinciding with said final surface, means for rotating said cutter head, and means for causing relative feeding movement between said head and the workpiece along said path at a rate correlated with the peripheral speed of said edges.

6. A machine for removing metal from a workpiece to form a plane surface thereon comprising, in combination, a cutter head having a series of concentric circular cutting edges disposed in planes approximately parallel to the plane of the desired final work surface with the successively smaller edges spaced progressively along the axis in a direction away from said head, means supporting a work piece for movement along a path parallel to said final surface and offset laterally from the axis of said head with the plane of the innermost edge coinciding with said final surface, means for rotating said cutter head, and means for causing relative feeding movement between said head and the workpiece along said path at a rate such as to cause each of said edges to act at shear angles less than forty degrees.

7. A method of removing metal from a workpiece to form a plane surface thereon comprising the steps of causing relative feeding movement between the work and a series of concentric circular cutting edges rotating about an axis perpendicular to the plane of the final work surface and disposed in planes spaced along said axis, and during such feeding movement causing the successive inwardly spaced edges to effect removal from the work of thin slices of metal down to the final work surface.

8. A method of removing metal from a workpiece to form a plane surface thereon comprising the steps of rotating a series of concentric circular edges disposed in progressively spaced axial planes, supporting a workpiece with the innermost edge coincident with the plane of the desired final work surface and the other edges intersecting the surface layer of the rough workpiece, and causing relative feeding movement between the positioned workpiece and said rotating edges to effect removal from the work of thin slices of metal progressively from the outer face of the work toward said final surface.

9. A method of removing metal from a workpiece to form a plane surface thereon comprising the steps of rotating a series of concentric circular edges disposed in progressively spaced axial planes, supporting a workpiece with the innermost edge coincident with the plane of the desired final work surface and the other edges intersecting the surface layer of the rough workpiece and causing relative feeding movement between the positioned workpiece and said rotating edges along a path offset from said axis and within said innermost edge.

10. A method of removing metal from a workpiece to form a plane surface thereon comprising the steps of rotating a series of concentric circular edges disposed in progressively spaced axial planes, supporting a workpiece with the innermost edge coincident with the plane of the desired final work surface and the other edges intersecting the surface layer of the rough workpiece, and causing relative feeding movement between the positioned workpiece and said rotating edges at a rate correlated with the peripheral speed of said edges to cause the edges to traverse the workpiece at effective shear angles of less than forty degrees.

11. A method of removing metal from a workpiece to form a plane surface thereon comprising the steps of causing relative feeding movement between the work and a series of axially projecting circular cutting edges rotating about an axis perpendicular to the desired final work surface of the work and disposed in spaced planes along such axis and during such feeding movement causing said spaced edges to effect removal from the work of successive slices of metal which are thin in a direction perpendicular to said final surface as compared with the total thickness of metal layers removed from the workpiece.

12. A cutter adapted to machine a plane surface on a workpiece when the cutter is rotated about its axis and is relatively fed in a direction parallel to said surface, said cutter comprising a body having a multiplicity of concentric circular cutting edges disposed in parallel planes perpendicular to the rotational axis of said body and progressively spaced from the outermost to the innermost edges in a direction away from an end face of said body.

13. A cutter adapted to machine a plane surface on a workpiece when the cutter is rotated about its axis and is relatively fed in a direction parallel to said surface, said cutter comprising a body having a multiplicity of concentric circular cutting edges disposed in parallel planes perpendicular to the rotational axis of said body and progressively spaced from the outermost to the innermost edges in a direction away from an end face of said body, the axial spacing of said edges diminishing in stages between the outermost and innermost edges.

14. A cutter adapted to machine a plane surface on a workpiece when the cutter is rotated about its axis and is relatively fed in a direction parallel to said surface, said cutter comprising a body having a multiplicity of concentric circular cutting edges disposed in parallel planes perpendicular to the rotational axis of said body and progressively spaced from the outermost to the innermost edges in a direction away from an end face of said body, the innermost edge being continuous and the outermost edge having notches formed therein at annularly spaced points.

15. A cutter adapted to machine a plane surface on a workpiece when the cutter is rotated about its axis and is relatively fed in a direction parallel to said surface, said cutter comprising a body having a series of concentric circular blade slots in one axial face, and a plurality of blade segments placed in abutting end to end relation around each of said slots and locked therein, the segments in each slot having edges cooperating to form a substantially continuous circular cutting edge.

16. A cutter adapted to machine plane surface on a workpiece when the cutter is rotated about its axis and is relatively fed in a direction parallel to said surface, said cutter comprising a body having an axially facing circular slot therein, a plurality of blade segments arranged in end to end relation in said slot and cooperating to form a substantially continuous circular cutting edge, and segmental wedges inserted between said segments and the opposed wall of said slot to lock said segments in said body.

17. A cutter adapted to machine a plane surface on a workpiece when the cutter is rotated about its axis and is relatively fed in a direction parallel to said surface, said cutter comprising a body having an axially facing circular slot therein, a plurality of blade segments arranged in end to end relation in said slot and cooperating to form a substantially continuous circular cutting edge, and segmental wedges inserted between said segments and the opposed wall of said slot to lock said segments in said body, the adjacent end surfaces of the adjacent wedges being disposed at an acute angle to said cutting edge and spaced apart to permit the insertion of a tool for releasing the wedge.

CHARLES E. KRAUS.